Nov. 3, 1964    R. F. ESTOPPEY ETAL    3,155,905
IRON VANE TYPE ELECTRICAL INDICATING INSTRUMENT WITH
MAGNETIC DAMPING MEANS AND INCLUDING FIXED
VANE AND COIL ADJUSTMENT MEANS
Filed April 24, 1961    2 Sheets-Sheet 1

INVENTORS
ROYDEN F. ESTOPPEY
JOHN GUGLIOTTA
BY
ATTORNEY

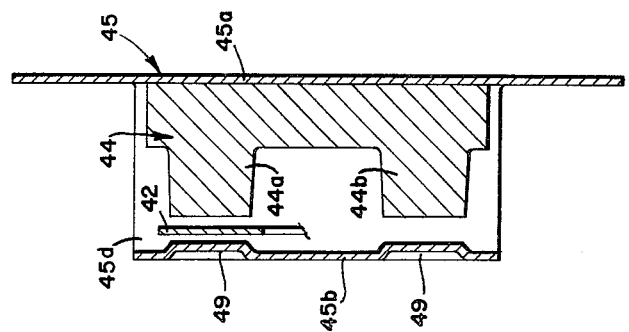
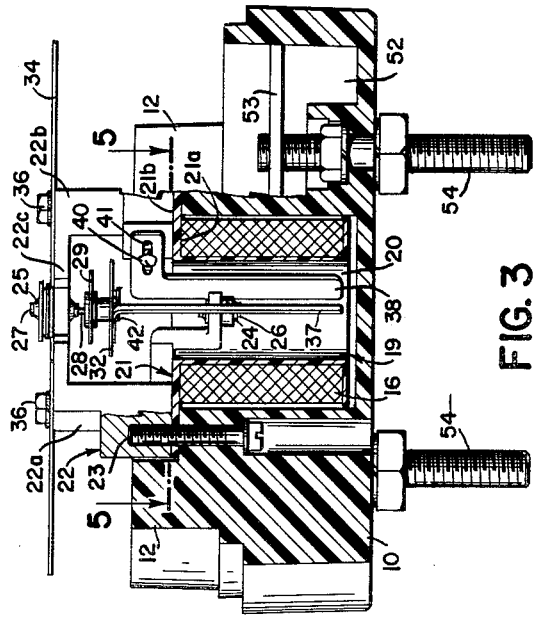
INVENTORS
ROYDEN F. ESTOPPEY
JOHN GUGLIOTTA
ATTORNEY

United States Patent Office 3,155,905
Patented Nov. 3, 1964

3,155,905
IRON VANE TYPE ELECTRICAL INDICATING INSTRUMENT WITH MAGNETIC DAMPING MEANS AND INCLUDING FIXED VANE AND COIL ADJUSTMENT MEANS
Royden F. Estoppey, Berkeley Heights, and John Gugliotta, Clark, N.J., assignors to Weston Instruments, Inc., a corporation of Texas
Filed Apr. 24, 1961, Ser. No. 104,971
1 Claim. (Cl. 324—147)

This invention relates to electrical indicating instruments and particularly to such instruments wherein a mechanically movable system is employed for providing an indication of the quantity to be measured.

The invention contemplates an improved electrical indicating instrument having a number of features which provide important advantages over prior art meters. The invention has particular reference to but is not limited to measuring instruments of the iron vane type.

It is an object of the invention to provide an improved electrical indicating or measuring instrument having an improved magnetic damping system which is considerably less expensive than other such systems employed in prior art meters.

Another object of the invention is to provide in an electrical measuring instrument a novel method and means for adjusting calibration of the instrument during manufacture.

Still another object of the invention is to provide a very inexpensive means for preventing the formation of condensation on the inner surface of the window in the front panel of the instrument when it is employed for measuring potential.

Figure 2:
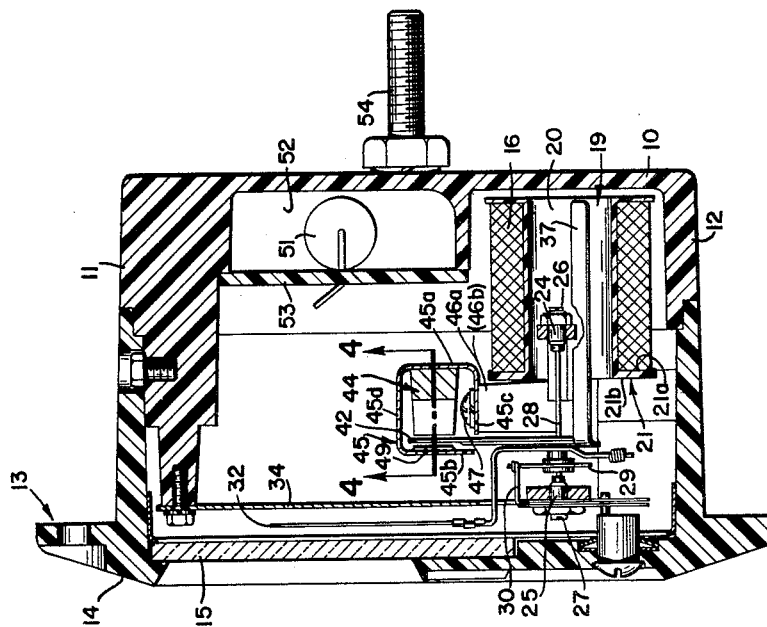
Figure 1:
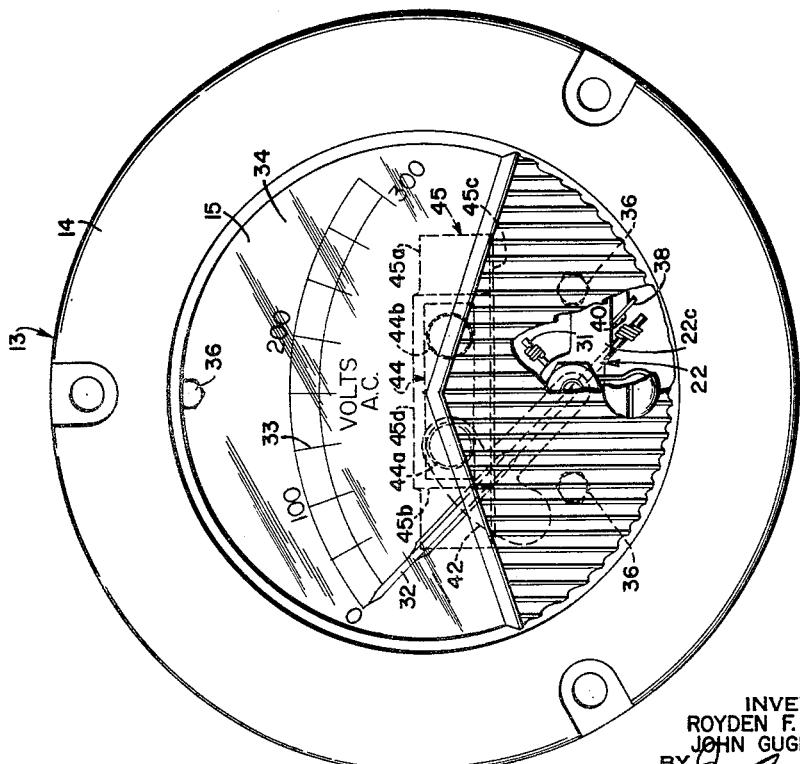

These and other objects, features and advantages will be best understood from a reading of the specification taken in conjunction with the claims and the drawings in which:

FIGURE 1 is a front or plan view of an electrical measuring instrument of the iron vane type embodying the invention, shown with portions broken away and with the pointer in the zero position, FIGURE 2 is a central vertical section of the instrument shown in FIGURE 1 with the pointer and movable portion of the instrument shown slightly beyond mid-scale deflection, FIGURE 3 is a view partly in section, as seen from the bottom of the instrument with the front casing of the meter removed and also with the movable portion of the instrument shown slightly beyond mid-scale deflection, FIGURE 4 is an enlarged view taken along the line 4—4 of FIGURE 2 in the direction of the arrows showing details of construction of the magnetic damping system employed in the instrument, and FIGURE 5 is a view taken along the line 5—5 of FIGURE 3 in the direction of the arrows showing construction details of the field coil assembly and its relation to the instrument base.

Briefly, the invention comprises an electrical instrument or meter having an indicating mechanism with a fixed system and also a movable system which is adapted to rotate upon the application of electric energy to the terminals of the instrument, the instrument further including a novel magnetic damping system. The damping system includes a fixed magnet mounted in an appropriate shield to produce a magnetic field or gap into which a movable non-magnetic plate attached to the movable portion of the mechanism is caused to move to produce the desired damping effect. A novel field coil assembly construction is also included to provide a method for adjusting the instrument by moving the field coil assembly in a direction perpendicular to the longitudinal axis of the coil. Further means are also provided for preventing the formation of condensation on the window of the instrument during operation when the instrument is employed to measure potential by isolating in a separate compartment the multiplying resistor usually employed when the instrument is used for such potential measurements.

Referring now to the drawings, there is shown an electrical measuring instrument of the iron vane type which includes a frame or base 10 preferably of molded insulating material having an upper protruding portion 11 and lower protruding portions 12. The base cooperates with a casing 13 of generally cylindrical shape and having a front panel section 14 with a window 15 therein, the entire assembly providing a dust-free enclosure for the mechanism inside.

An iron vane type mechanism is secured in fixed relationship to the base 10 and includes a fixed system comprising a field coil 16 having ends 17 and 18 and wound on a bobbin 19. The bobbin is provided with a hollow core 20 and with a broad mounting flange 21 at one end, the inner surface 21a of which is supported on surfaces of the lower protruding portions 12 of the base.

A unitary generally U-shaped bracket 22, see FIGURE 3, having legs 22a and 22b and a bridge portion 22c, is adapted to be supported on the outer surface 21b of the bobbin mounting flange 21. This bracket is held in fixed relationship with the base lower sections 12 by means of a pair of screws 23 which also hold the field coil bobbin assembly 16, 19 in fixed position when tightened.

The U-shaped bracket 22 is provided with a pair of pivot jewel bearings 24 and 25 located respectively in jewel screws 26 and 27, the former being mounted in the leg 22a and the latter being mounted in the bridge section 22c of the bracket 22 for supporting the movable system of the instrument mechanism. The movable system comprises a shaft 28 pivotally supported at its opposite ends for rotation in the jewel bearings 24 and 25, a conventional hair spring 29 attached to the shaft at one end and to an adjustable arm 30 of a zero adjusting mechanism at its other end, a balance cross 31, and a pointer 32, the latter cooperating with a scale 33 provided on a scale plate 34 affixed to the top of the U-shaped bracket 22 and the upper protruding portion 11 of the base 10 by means of three screws 36. The movable system also includes a movable vane 37 secured to the shaft 28 and extending into the hollow core 20 for actuating the movable system due to the magnetic influence of the field coil 16. A fixed vane 38 of generally L shape also extends into this aperture and is secured to the leg 22b of the bracket 22 by means of a screw 40. A slot 41 is provided in the short leg of this L shaped fixed vane to provide calibration adjustment of the instrument as will later appear.

An arcuate plate 42 of electrically conductive, non-magnetic material such as, for example, aluminum, is also secured to the shaft 28 and is adapted to be rotated into the gap of a fixed magnet assembly to produce damping of the movable system. The details of construction of this feature are clearly shown in FIGURES 1, 2 and 4 whrein the numeral 44 indicates a generally bar shaped permanent magnet having two extending cylindrical pole pieces 44a and 44b. This magnet is secured such as for example by glue to the bottom 45a of a mounting bracket 45 of magnetic material such as soft iron having a generally rectangular cross-section as seen in FIGURE 2, the top being indicated by 45b and the sides by 45c and 45d. The top 45b and side 45d extend approximately the length of the magnet 44 while the bottom 45a and side 45c are somewhat longer. This bracket is secured to extended portions 46a and 46b of the unitary bracket legs 22a and 22b respectively by means of screws 47 through the side 45c of the bracket 45. The top side 45b of the bracket has a pair of circular indentations 49 formed therein in the region immediately above the poles 44a and 44b to thereby concentrate the magnetic flux in the gap between these poles and the indentations. The bracket 45 serves several functions, i.e., as a base for the permanent magnet 44, as a magnetic path for conducting the magnetic flux from the magnet to the magnetic gap and as a shield or enclosure to prevent stray flux from reaching other parts of the mechanism and thereby adversely affect its operation. It will now be appreciated that as the movable system of the mechanism rotates, the arcuate plate 42 will enter the magnetic gap between the poles 44a and 44b and the bracket top 45b whereby an electromotive force will be induced in the plate to produce the desired damping effect and thus prevent oscillation of the movable system.

The invention further contemplates the inclusion of an additional feature which is particularly advantageous when the mechanism of the instrument is employed as a voltmeter. When so employed, it is usual, as those knowledgeable in the art are aware, to employ a multiplier resistor to allow the instrument to measure a given range of potential. Considerable difficulty, however, can be encountered due to the dissipation of heat from the multiplier resistor which often causes condensation of water vapor from the air onto the inside surface of the window 15 obscuring the scale 33 from view. We have eliminated this problem by housing the multiplier resistor in a separate chamber to isolate the heating effect of the resistor from the air in the region or compartment immediately behind the window.

Accordingly, a multiplier resistor 51 of suitable resistance is provided in a cavity 52 preformed in the rear of the meter base 10. This cavity is effectively sealed off from the internal region of the instrument adjacent the window by closing it with an inexpensive plastic front cover plate 53, on which the resistor 51 is preferably mounted, to thereby provide a closed chamber for the resistor. This plate may be glued on, snapped in position, or secured in any other suitable manner. The resistor is connected in series with the field coil 16 in a manner well known in the art between two spaced terminals 54 on the back of the meter base. By this very inexpensive construction, heat generated by the multiplier resistor is effectively isolated from the front compartment of the meter containing the mechanism so that condensation is not formed on the window 15.

FIGURE 5 shows details of construction of the field coil assembly where it will be seen that the bobbin mounting flange 21 is provided with slots 55 to allow movement of the assembly in the direction of these slots. This feature provides a means for moving the coil in a direction transverse to its longitudinal axis to provide control of the deflection characteristics of the instrument.

Specifically, the transverse movement of the coil is provided to adjust the pointer-scale calibration or, stated differently, to provide greater accuracy between the scale 33 which is printed on the scale plate 34, and the pointer deflection for a given input to the meter. Typically, this adjustment is made in conjunction with the full scale adjustment, the latter being accomplished by moving the fixed vane 38. Accordingly, when the instrument is assembled, the instrument, which may be either a current or voltage indicating instrument, is connected to an electric energy source which applies a value of the quantity to be measured to the terminals of the instrument. In the present example, a voltmeter is used and accordingly 300 volts would be applied since that is the full scale value, and the deflection of the pointer 32 would be carefully observed. If the pointer does not accurately indicate the value 300, the screw 40 is loosened and the fixed vane 38 is moved in the direction of the slot 41 until the pointer indicates exactly 300 volts. The input voltage is then reduced to a lower value, for example 200 volts, and the pointer reading is then again observed. If this value is not exactly 200, the screws 23 are loosened and the field coil assembly 16, 19 is then moved transversely in the direction of the slots 55 in the bobbin flange 21 until the pointer indicates exactly 200 volts. This latter step, whereby the pointer is made to accurately indicate a reading of 200 on the scale with an input of 200 volts, is repeated for a lower value, for example 100 volts. Both the field coil 16 and the fixed vane 38 positions, however, affect the deflection characteristics of the instrument, although the former affects primarily the medium deflection values and the latter has a greater effect upon the full scale deflection. Accordingly, after the 200 and 100 volt adjustments have been completed, the input potential is again raised to 300 volts and if the pointer does not indicate a value of 300 the fixed vane 38 is again adjusted until this value is achieved. The intermediate scale values 200 and 100 are then checked again to insure accuracy of calibration and appropriate adjustment of the field coil assembly 16, 19 is again made, if necessary. When proper overall calibration has been achieved, the fixed vane and the field coil assembly are firmly secured in position by means of the screws 40 and 23 respectively.

Our invention now having been described, the advantages of the novel features thereof are clearly apparent. Our improved magnetic damping assembly has only two parts, i.e., a magnet and a support shield, which are fewer in number than required for prior art shielded magnet assemblies and results in considerably greater ease of assembly and a reduction in material cost. Additionally, the form of the magnet 44 with its projecting pole pieces can be produced at a cost far less than the magnets conventionally employed in magnetic damping assemblies. This factor combined with the reduction in the number of parts required for the shielded magnetic damping assembly has resulted in an overall material cost for these assemblies of less than 25% of the cost of the assemblies used heretofore.

Furthermore, the method of adjusting scale calibration at intermediate scale positions of the pointer by laterally moving the field coil to align the pointer with a given scale marking represents a new departure, so far as we are aware, from conventional techniques for accomplishing such alignment. Heretofore, differences between the pointer deflection and given intermediate scale markings with which the pointer should coincide were resolved by substituting various scale plates having varying scale marking distributions until one was found which most closely matched the pointer deflection. Obviously, the field coil relocation adjustment method described herein is far superior to the scale plate substitution method for a number of reasons. One very important advantage is that absolute accuracy can now be achieved rather than only reasonably accurate alignment resulting from the selection of the scale plate having the scale which most nearly matches the deflection characteristics of the mechanism. Another advantage is that only one scale plate is now required rather than several so that a further cost reduction is realized. Finally, the overall calibration operation is more easily accomplished. A cost reduction is also realized by the particular construction employed to isolate the multiplier resistor. This is achieved simply by transforming the preformed cavity in the instrument base into a closed chamber by the use of a very inexpensive cover plate.

Since many changes could be made in the above construction and many apparently widely different embodiments of this invention could be made without departing from the scope thereof, it is intended that all matter contained in the above description or shown in the accompanying drawings shall be interpreted as illustrative and not in a limiting sense.

We claim:

An electrical indicating instrument of the iron vane type comprising a pair of input terminals, a mechanism connected to said input terminals and having a fixed system including a field coil assembly and a movable system cooperating with said fixed system for producing rotation of said movable system when electrical energy is applied to said terminals, a scale, said movable system including a first vane and a pointer for cooperating with said scale to provide a measure of the electrical input to said terminals, magnetic damping means, said damping means including a shield of magnetic material and a generally bar shaped magnet having a plurality of extending pole pieces, said shield having top, bottom, front and rear sides substantially enclosing said magnet and including indentations formed in a portion of said shield adjacent said pole pieces to thereby form a magnetic gap between said pole pieces and said indentations, said bottom shield side having a narrow slot extending lengthwise of said shield and said damping means further including an electrically conductive non-magnetic plate adapted for rotation through said slot into said magnetic gap when said movable system is rotated, said field coil assembly including a coil wound upon a bobbin, said bobbin having a mounting flange with a plurality of slots adapted to allow movement of said coil with respect to said movable system in a direction transverse to the longitudinal axis of said coil to thereby provide means for aligning said pointer with the intermediate divisions of said scale upon application of said electrical input to said terminals, and means for aligning said pointer with divisions on the upper end of said scale, said means including a second vane in the fixed system substantially disposed within said coil and extending generally in the direction of the longitudinal axis of said coil, said second vane being adjustable in a direction transverse to said longitudinal axis with respect to both said coil and said movable system.

References Cited in the file of this patent

UNITED STATES PATENTS

| | | |
|---|---|---|
| 442,423 | Currie | Dec. 9, 1890 |
| 496,678 | Armen | May 2, 1893 |
| 2,196,898 | Faus | Apr. 9, 1940 |
| 2,456,667 | Alter | Dec. 21, 1948 |
| 2,875,409 | Lamb | Feb. 24, 1959 |